(12) United States Patent
Kashiwagi et al.

(10) Patent No.: US 10,987,799 B2
(45) Date of Patent: Apr. 27, 2021

(54) WORKPIECE PROCESSING SYSTEM

(71) Applicant: DMG MORI CO., LTD., Nara (JP)

(72) Inventors: Satoru Kashiwagi, Nara (JP); Tomoaki Yoda, Nara (JP); Masaaki Nakagawa, Nara (JP); Akira Kitanishi, Nara (JP)

(73) Assignee: DMG MORI CO., LTD., Nara (JP)

( * ) Notice: Subject to any disclaimer, the term of this patent is extended or adjusted under 35 U.S.C. 154(b) by 159 days.

(21) Appl. No.: 16/333,145

(22) PCT Filed: Jun. 22, 2017

(86) PCT No.: PCT/JP2017/022960
§ 371 (c)(1),
(2) Date: Mar. 13, 2019

(87) PCT Pub. No.: WO2018/051601
PCT Pub. Date: Mar. 22, 2018

(65) Prior Publication Data
US 2019/0210215 A1    Jul. 11, 2019

(30) Foreign Application Priority Data
Sep. 14, 2016  (JP) .............................. JP2016-179662

(51) Int. Cl.
*B25J 9/00*      (2006.01)
*G05B 19/4093*   (2006.01)
(Continued)

(52) U.S. Cl.
CPC .......... *B25J 9/0081* (2013.01); *B25J 9/1664* (2013.01); *G05B 19/4093* (2013.01);
(Continued)

(58) Field of Classification Search
USPC ....................................................... 700/112
See application file for complete search history.

(56) References Cited

U.S. PATENT DOCUMENTS 6,510,365 B1    1/2003  Nishinakayama et al.
2005/0220582 A1  10/2005  Kumagai et al.
(Continued)

FOREIGN PATENT DOCUMENTS

JP    H05324034 A    12/1993
JP    2000024970 A    1/2000
(Continued)

OTHER PUBLICATIONS

International Search Report for related European Application No. 17850507.9; report dated Apr. 6, 2020.
(Continued)

*Primary Examiner* — Md Azad
(74) *Attorney, Agent, or Firm* — von Briesen & Roper, s.c.

(57) ABSTRACT

A workpiece processing system (1) includes a transfer robot (3), a control device (4) controlling operation of the transfer robot (3), and an operating part (5) performing a teaching operation to the transfer robot (3). The control device (4) has an approach point setter (6) setting in advance an approach point as a reference point for the transfer robot (3) to start operation to a workpiece processing device, a first program generator (7) generating a first program defining the operation of the transfer robot (3) from an operational zero point for the transfer robot (3) to the approach point, a second program generator (8) generating a second program defining the operation of the transfer robot (3) after the approach point based on the teaching operation, and a robot controller (9) controlling the operation of the transfer robot (3) in accordance with the first program and the second program.

8 Claims, 8 Drawing Sheets

(51) Int. Cl.
*B25J 9/16* (2006.01)
*G05B 19/418* (2006.01)
(52) U.S. Cl.
CPC .............. *G05B 19/4189* (2013.01); *G05B 2219/39001* (2013.01); *G05B 2219/45054* (2013.01)

(56) References Cited

U.S. PATENT DOCUMENTS

| | | | | |
|---|---|---|---|---|
| 2006/0217841 | A1* | 9/2006 | Matsumoto | B25J 9/1669 700/248 |
| 2010/0305758 | A1* | 12/2010 | Nishi | B23Q 17/00 700/264 |
| 2014/0199138 | A1* | 7/2014 | van der Meulen | B65G 25/02 414/217 |
| 2014/0350714 | A1 | 11/2014 | Kimura et al. | |
| 2016/0059413 | A1* | 3/2016 | Ogata | B25J 9/1676 700/186 |

FOREIGN PATENT DOCUMENTS

| | | | |
|---|---|---|---|
| JP | 2010099755 | A | 5/2010 |
| JP | 2014229757 | A | 12/2014 |
| JP | 2015182173 | A | 10/2015 |
| WO | 2004024401 | A1 | 3/2004 |

OTHER PUBLICATIONS

International Search Report for related Application No. PCT/JP2017/022960; report dated Sep. 5, 2017.

\* cited by examiner

WORKPIECE PROCESSING SYSTEM

TECHNICAL FIELD

The present invention relates to a workpiece processing system which performs a teaching to store a moving path into a transfer robot before causing the transfer robot to transfer a workpiece to and from a workpiece processing device.

BACKGROUND ART

Conventionally, it is known that, in a workpiece processing system having a plurality of workpiece processing devices (for example, an NC (numerically controlled) machine tool and its peripheral devices) provided therein, a workpiece is transferred between the workpiece processing devices, for example, by an articulated robot. Note that examples of the aforementioned peripheral devices include, for example, a measuring device, an air blow device, a tool changer, and a deburring device.

When a workpiece is transferred by the articulated robot in the above-described workpiece processing system, before actually causing the workpiece processing system to operate, a teaching operation (teaching) is necessary to store a moving path for transferring the workpiece to each workpiece processing device with the workpiece being gripped by the articulated robot. Performing a teaching in advance allows, when the articulated robot is actually operated, a workpiece to be transferred without contact of the articulated robot holding the workpiece with peripheral members.

For example, Patent Literature 1 discloses a robot simulation apparatus which displays a virtually-operated device model of an actual device as an image, which is used for simulation using shape data created by a three-dimensional CAD, and moves an image of a movable part on the display screen in accordance with a control program to check for interference of the part.

This robot simulation apparatus includes a program converter, a storage, a computing and controlling part, and a teaching point storage. The program converter converts a program description language for robot into a program for simulation, and the storage stores therein three-dimensional shapes of the robot and peripheral devices. Further, the computing and controlling part arranges three-dimensional models, sets teaching points, and executes a simulation, and the teaching point storage stores therein teaching points for operating the robot model.

CITATION LIST

Patent Literature

Patent Literature 1: Japanese Unexamined Patent Application Publication No. 2000-024970

SUMMARY OF INVENTION

Technical Problem

However, even though teaching points for simulation are set in the above-described conventional robot simulation apparatus, an operator has to perform a teaching based on the teaching points for simulation when actually causing the robot to operate. Therefore, the number of operator's operations is not reduced. Especially when the moving path for the robot is complicated, the number of operator's operations in the teaching is increased. Accordingly, there has been a desire for a workpiece processing system which achieves a reduced number of operator's operations.

The present invention has been achieved in view of the above-described circumstances and an object thereof is to provide a workpiece processing system which achieves a reduced number of operator's operations.

Solution to Problem

A workpiece processing system according to the present invention includes:

at least one workpiece processing device processing a workpiece;

a transfer robot loading and unloading the workpiece into and from the workpiece processing device;

a control device controlling operation of the transfer robot; and an operating part connected to the control device to perform a teaching operation to the transfer robot by manually operating the transfer robot, and the control device having:

an approach point setter setting in advance an approach point corresponding to the workpiece processing device as a reference point for the transfer robot to start operation to the workpiece processing device;

a first program generator generating a first program defining the operation of the transfer robot from an operational zero point for the transfer robot to the approach point set by the approach point setter;

a second program generator generating a second program defining the operation of the transfer robot after the approach point based on the teaching operation performed by the operating part; and a controller controlling the operation of the transfer robot in accordance with the first program generated by the first program generator and the second program generated by the second program generator.

In the present invention, a workpiece is processed in a workpiece processing device. Examples of the workpiece processing device include an NC machine tool, a measuring device, and a deburring device. Further, a teaching operation is performed to a transfer robot by an operating part. A control device includes an approach point setter, a first program generator, a second program generator, and a controller controlling operation of the transfer robot.

The approach point setter sets an approach point corresponding to the workpiece processing device. In a case where the workpiece processing system has a plurality of workpiece processing devices provided therein, an approach point is set for each of the workpiece processing devices. In the present invention, the first program generator generates a first program which defines the operation of the transfer robot from an operational zero point for the transfer robot to the approach point. Further, the second program generator generates a second program which defines the operation of the transfer robot after the approach point, based on the teaching operation. The controller controls the operation of the transfer robot in accordance with the first program and the second program.

In the present invention, the approach point is a reference point for the transfer robot to start operation to the workpiece processing device, i.e., a reference point for starting an operation based on the teaching operation to the workpiece processing device, which is different from a teaching point set through the teaching operation performed by the operating part. In other words, the approach point ensures that no interference by the transfer robot which holds a workpiece of a maximum possible size occurs in a moving path from the operational zero point to the approach point, without performing a teaching that is needed in the conventional art. For example, regularly arranging the workpiece processing devices enables a region where the transfer robot in the workpiece-holing state does not interfere (hereinafter, this region is called "non-interference region") to be recognized easily in advance. This allows the approach point to be set based on the non-interference region. Further, for example, standardizing the sizes (for example, footprints or the like) of the workpiece processing devices also enables the non-interference region to be recognized easily, which allows the approach point to be set based on the non-interference region. Accordingly, operating the transfer robot in accordance with the first program generated by the first program generator in the present invention ensures that no interference by the transfer robot occurs, without performing a teaching that is needed in the conventional art.

As described above, with the workpiece processing system according to the present invention, an operation program which defines the operation of the transfer robot from the operational zero point to the approach point and ensures that no interference by the transfer robot occurs (i.e., the first program) can be generated by setting the approach point based on the non-interference region as described above. Therefore, using this first program eliminates the need of performing a teaching that is needed in the conventional art, for the operation of the transfer robot from the operational zero point to a position equivalent to the approach point. Thereby, the number of operator's operations can be greatly reduced.

In the present invention, it is preferable that a plurality of said workpiece processing devices are provided, each of the workpiece processing devices has a portion for approach point setting provided therein for setting the approach point, and the approach point setter is configured to set the approach point at a point spaced by a predetermined distance from the portion for approach point setting.

In this aspect, the approach point can be set more easily on the basis of the portion for approach point setting provided in each workpiece processing device and the predetermined distance.

In the present invention, it is preferable that the portion for approach point setting is a loading and unloading aperture of the workpiece processing device through which the workpiece is loaded into and unloaded from the workpiece processing device by the transfer robot, and the loading and unloading apertures of the workpiece processing devices have an identical shape.

In this aspect, each of the workpiece processing devices has a loading and unloading aperture as the portion for approach point setting provided therein, the loading and unloading apertures having an identical shape; therefore, the approach point can be set more easily on the basis of the loading and unloading aperture.

In the present invention, it is preferable that a plurality of said workpiece processing devices are provided, and a footprint of each of the workpiece processing devices is set on the basis of a unit size.

In this aspect, a footprint of each of the workpiece processing devices is set on the basis of a unit size; therefore, the aforementioned non-interference region can be recognized easily. Thereby, the setting of the approach point is facilitated. Note that the setting on the basis of a unit size means setting to a size of, for example, twice or four times a certain size as a reference (for example, 710 mm×710 mm or the like).

In the present invention, it is preferable that the approach point setter is configured to set the approach point at a position commonized for the workpiece processing devices of each size.

In this aspect, it is possible to reduce the number of steps for setting the approach point in a case where two or more workpiece processing devices have the same size.

In the present invention, it is preferable that the workpiece processing devices are arranged to surround the transfer robot in plan view and arranged such that their lines on the transfer robot side in plan view form at least a part of a U-shape.

In this aspect, the workpiece processing devices are arranged such that their lines on the transfer robot side in plan view form at least a part of a U-shape; therefore, the aforementioned non-interference region can be recognized easily. Thereby, the setting of the approach point is facilitated.

In the present invention, it is preferable that the approach point setter is configured to set the approach point at a position above the workpiece processing device or at a position higher than the workpiece processing device between the workpiece processing device and the transfer robot.

In this aspect, in a case where the workpiece processing device has the loading and unloading aperture provided in a top surface portion thereof, the approach point can be set, for example, at a position higher than the workpiece processing device between the workpiece processing device and the transfer robot or at a position above the workpiece processing device. In a case where the workpiece processing device has the loading and unloading aperture provided in a front surface portion thereof, the approach point can be set at a position higher than the workpiece processing device between the workpiece processing device and the transfer robot.

Advantageous Effects of Invention

According to the present invention, a workpiece processing system can be provided which achieves a reduced number of operator's operations.

DESCRIPTION OF EMBODIMENTS

Hereinafter, a workpiece processing system according to an embodiment of the present invention will be described with reference to the drawings.

Figure 1:
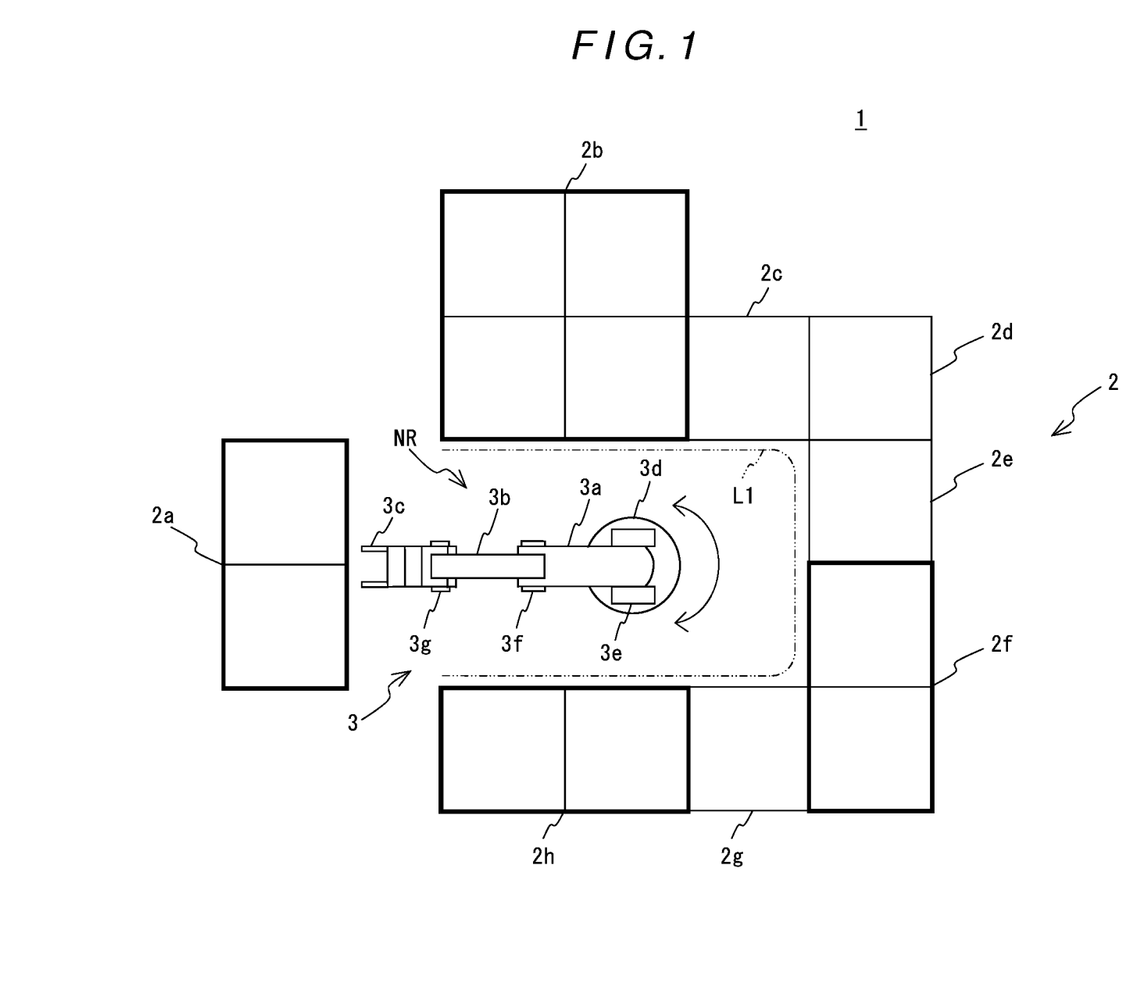
FIG. 1 is a schematic plan view of a workpiece processing system according to an embodiment of the present invention.

As shown in FIG. 1, the workpiece processing system 1 according to this embodiment includes a plurality of workpiece processing devices 2, a transfer robot 3 loading and unloading a workpiece into and from the workpiece processing devices 2, a control device 4 (see FIG. 2) controlling operation of the transfer robot 3, and an operating part 5 (see FIG. 2) connected to the control device 4 to perform a teaching operation to the transfer robot 3 by manually operating the transfer robot 3. As shown in FIG. 1, the plurality of workpiece processing devices 2 include workpiece processing devices 2a, 2b, 2c, 2d, 2e, 2f, 2g, 2h, the workpiece processing devices 2a, 2b, 2c, 2d, 2e, 2f, 2g, 2h being regularly arranged and the sizes thereof (for example, footprint or the device's own length, width, and height) being standardized. Hereinafter, the workpiece processing devices 2a, 2b, 2c, 2d, 2e, 2f, 2g, 2h are sometimes collectively called "workpiece processing devices 2". The workpiece processing device 2a is, for example, an NC machine tool. The workpiece processing devices 2b, 2c, 2d, 2e, 2f, 2g, 2h are each, for example, any of a measuring device, an air blow device, a deburring device, a tool changer, a hand changer, a stocker, and the like (these devices may be called "peripheral device").

FIG. 1 shows installation areas for the workpiece processing devices 2 being standardized. Note that, in FIG. 1, each workpiece processing device 2 is identified by assigning the reference numeral denoting the workpiece processing device 2 to the standardized installation area therefor. Each workpiece processing device 2 is arranged in the installation area therefor that has an area determined by a predetermined multiple of a unit size (called "module size"), the unit size being a predetermined area of square installation area. By way of example, as shown in FIG. 1, the workpiece processing devices 2a, 2f, 2h each have a footprint of two-module size that is twice the unit size. Further, the workpiece processing device 2b has a footprint of four-module size that is four times the unit size. Further, the workpiece processing devices 2c, 2d, 2e, 2g each have a footprint of one-module size that is equal to the unit size. Thus, the workpiece processing devices 2 have their respective footprints standardized. Note that, in FIG. 1 and FIG. 8, which is described later, the workpiece processing devices 2 having a footprint of two-module size or four-module size are indicated by bold lines.

The workpiece processing devices 2 other than the workpiece processing device 2a are arranged to surround the transfer robot 3 in plan view and arranged such that their lines on the transfer robot 3 side in plan view together substantially form a U-shape (see the dashed and double-dotted line L1 in FIG. 1). Note that the workpiece processing device 2a is arranged on the left side of the transfer robot 3 in FIG. 1. Thus, not only the footprints of the workpiece processing devices 2 but also the installation areas for the workpiece processing devices 2 (i.e., arrangement of the workpiece processing devices 2) are regularized.

Next, the transfer robot 3 is described. The transfer robot 3 is, for example, an articulated robot. As shown in FIG. 1 and FIG. 3(a)-(c), the transfer robot 3 includes arms 3a, 3b, a hand 3c, a base 3d, and joints 3e, 3f, 3g each having a built-in drive motor. The base 3d is arranged on the installation surface and configured to be rotatable about a vertical axis. The arm 3a is configured to be slanted in a desired angle by the joint 3e, the arm 3b is configured to be slanted in a desired angle by the joint 3f, and the hand 3c is configured to be slanted in a desired angle by the joint 3g. The hand 3c holds a workpiece, the workpiece being not shown in the drawings. The hand 3c may have any structure. The hand 3c may have a structure for gripping a workpiece or may have a structure for holding a workpiece by hydraulic adhesion or magnetic adhesion.

For example, the transfer robot 3 extracts a machined workpiece from the workpiece processing device (for example, an NC machine tool) 2a and loads the extracted workpiece into the workpiece processing device (for example, a deburring device) 2c with the hand 3c. Thus, the transfer robot 3 is configured to load and unload a workpiece between one workpiece processing device 2 and another workpiece processing device 2.

Figure 2:
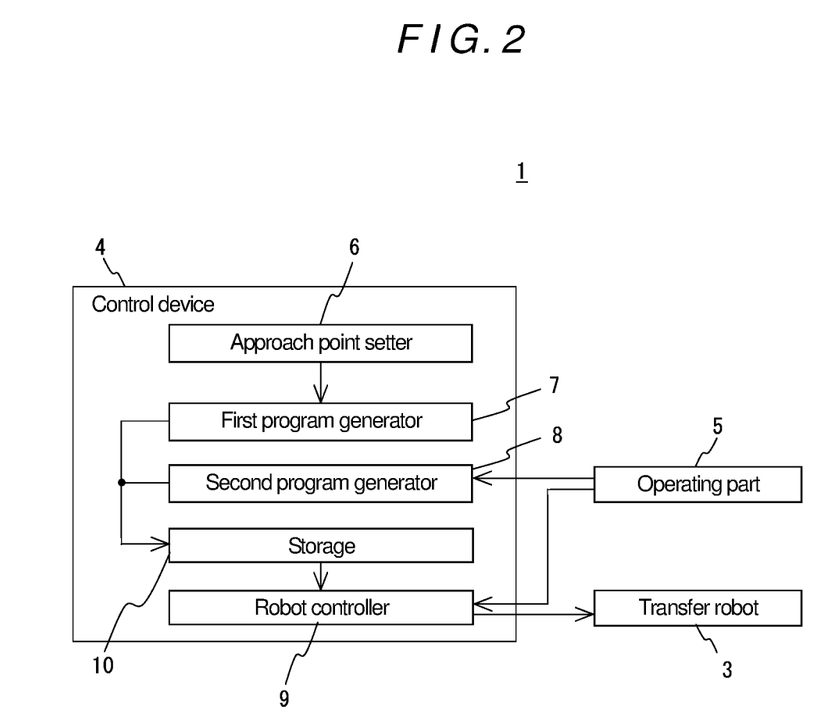
FIG. 2 is a block diagram showing a control system of the workpiece processing system according to the embodiment.
Figure 3:
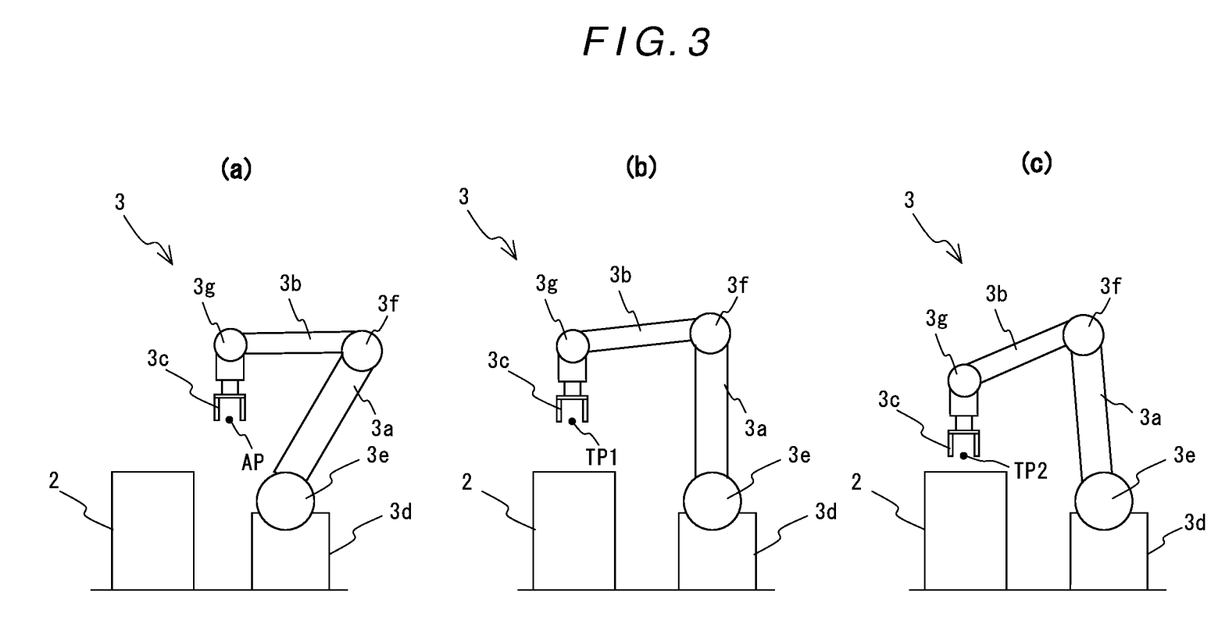
FIG. 3(a)-(c) are illustrations showing an example of operation of a transfer robot from an approach point to a teaching point.

Next, a control system of the workpiece processing system 1 according to this embodiment is described. As shown in FIG. 2, the control device 4 includes an approach point setter 6, a first program generator 7, a second program generator 8, a robot controller 9, and a storage 10. The approach point setter 6, the first program generator 7, and the second program generator 8 are functionally implemented by a central processing unit (CPU), which is provided in the control device 4, executing a predetermined program stored in a memory.

The approach point setter 6 sets an approach point AP (see FIGS. 3 and 4) as a reference point for the transfer robot 3 to start operation to each workpiece processing device 2, based on a non-interference region (the region between the transfer robot 3 in a state of holding a workpiece and each of the workpiece processing devices 2 in FIG. 1) NR that is recognized from the sizes and arrangement of the workpiece processing devices 2. The approach point AP is set for each of the workpiece processing devices 2. The approach point AP is a reference point for the transfer robot 3 to start operation to the workpiece processing device 2, that is, a reference point for starting an operation (handling) based on the teaching operation to the workpiece processing device 2, which is different from a teaching point set by the teaching operation performed by the operating part 5.

Figure 4:
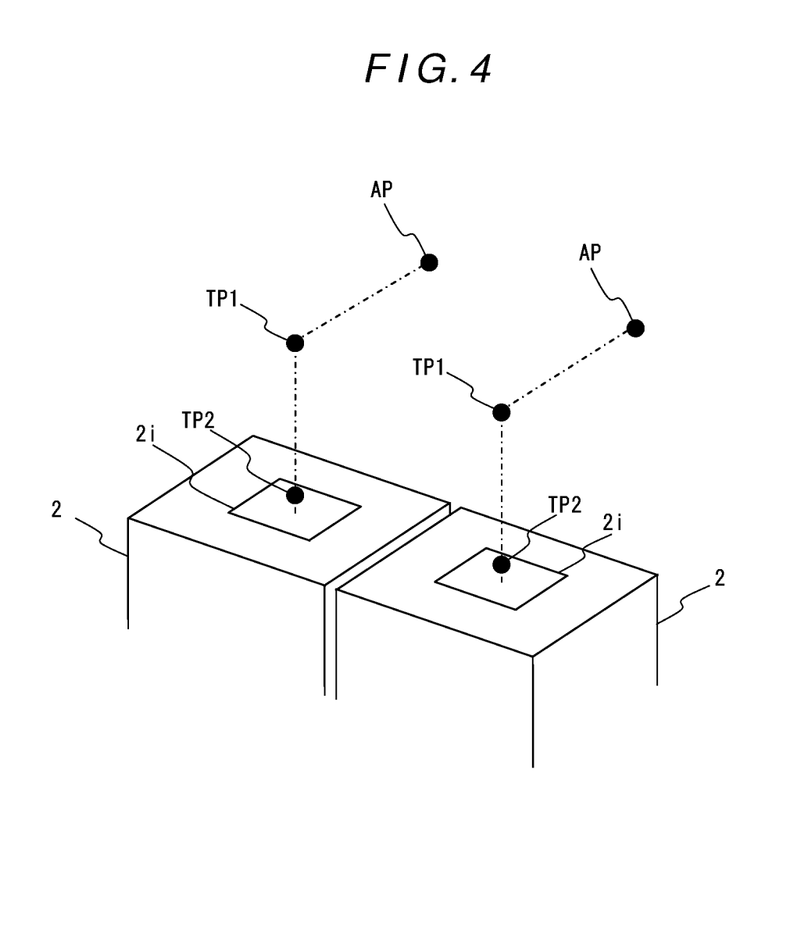
FIG. 4 is a perspective view showing an approach point and teaching points corresponding to a workpiece processing device of one-module size.

As shown in FIG. 4, each of the workpiece processing devices 2 may have a loading and unloading aperture 2i provided in a top surface portion thereof, the loading and unloading apertures 2i having an identical shape. In this case, the approach point AP can be set at a position spaced by a predetermined distance from the loading and unloading aperture 2i (equivalent to a portion for approach point setting), for example, a position higher than the workpiece processing device 2 between the workpiece processing device 2 and the transfer robot 3. Alternatively, the approach point AP may be set at a position above the workpiece processing device 2. TP1 and TP2 in FIG. 4 are teaching points the operator sets through the teaching operation performed by the operating part 5. The hand 3c of the transfer robot 3 is first positioned to the approach point AP from an operational zero point, after which the hand 3c is moved to the teaching point TP2 set directly above the loading and unloading aperture 2i via the teaching point TP1, which is described later.

The first program generator 7 is configured to generate a first program which defines the operation of the transfer robot 3 from the operational zero point for the hand 3c of the transfer robot 3 to the approach point AP. The second program generator 8 is configured to generate a second program which defines the operation of the transfer robot 3 after the approach point AP, i.e., the operation of the transfer robot 3 from the approach point AP to the teaching point TP2 via the teaching point TP1, based on the teaching operation performed by the operating part 5. The first program and the second program are stored into the storage 10.

The robot controller 9 controls operation of the transfer robot 3 based on the first program and second program stored in the storage 10. Specifically, as shown in FIG. 3(a), the robot controller 9 controls the parts of the transfer robot 3 based on the first program so that the hand 3c is positioned to the approach point AP. Subsequently, as shown in FIG. 3(b), the robot controller 9 controls the parts of the transfer robot 3 based on the second program so that the hand 3c is positioned to the teaching point TP1 from the approach point AP. Subsequently, as shown in FIG. 3(c), the robot controller 9 controls the parts of the transfer robot 3 based on the second program so that the hand 3c is positioned to the teaching point TP2 from the teaching point TP1. Through these control operations, the hand 3c of the transfer robot 3 is positioned to the approach point AP from the operational zero point, and then moved to the teaching point TP2 via the teaching point TP1.

Figure 5:
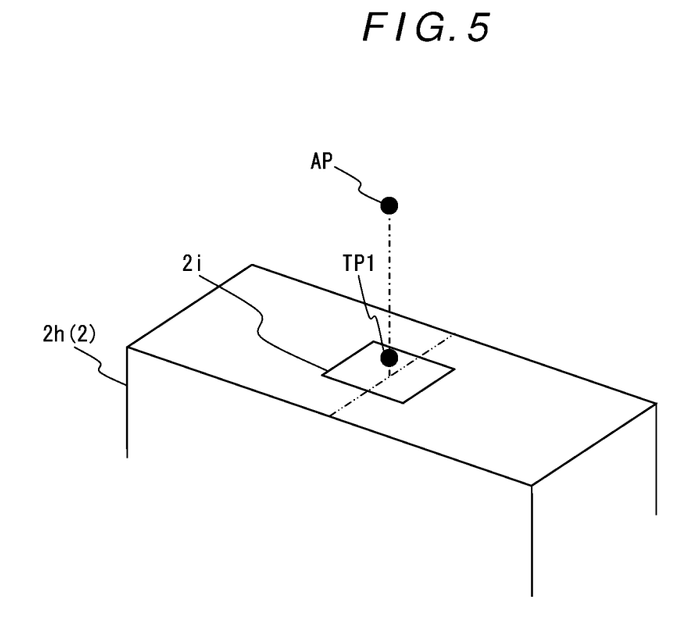
FIG. 5 is a perspective view showing an approach point and teaching points corresponding to a workpiece processing device of two-module size.

The approach point setter 6 is configured to set the approach point AP at a position commonized for the workpiece processing devices 2 of each module size. For example, as shown in FIG. 5, as for the workpiece processing device 2h having the loading and unloading aperture 2i provided in the top surface portion thereof and having two-module size, the approach point AP is set at a position above the center in the length direction in plan view of the workpiece processing device 2h. Further, as for the workpiece processing device 2b having the loading and unloading aperture 2i provided in the top surface portion thereof and having four-module size, the approach point AP is set at a position above the intersection of the two diagonal lines in plan view of the workpiece processing device 2b, illustration of which is omitted. Thus, in the case where, as in this embodiment, two or more workpiece processing devices 2 have the same size, the approach points AP for the workpiece processing devices 2 having the same size can be commonized (i.e., standardized).

Figure 6:
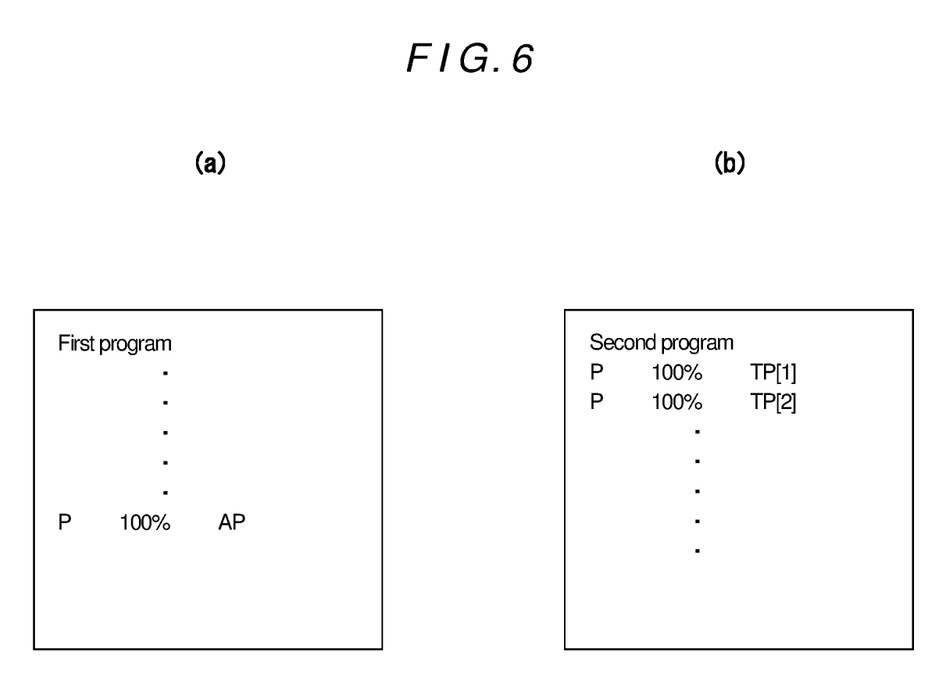
FIG. 6(a) is an illustration showing an example of a first program for operating the transfer robot and FIG. 6(b) is an illustration showing an example of a second program for operating the transfer robot.

Next, an example program for causing the transfer robot 3 to operate is described. FIG. 6(a) is an illustration showing an example of the first program, and FIG. 6(b) is an illustration showing an example of the second program. As shown in FIG. 6(a), the first program generated by the first program generator 7 contains the command "P 100% AP" for causing the transfer robot 3 to move to the approach point AP, for example, at 100% speed. Further, as shown in FIG. 6(b), the second program generated by the second program generator 8 contains the command "P 100% TP[1]" for causing the transfer robot 3 to move to the teaching point TP1, for example, at 100% speed and the command "P 100% TP[2]" for causing the transfer robot 3 to move to the teaching point TP2, for example, at 100% speed".

Figure 7:
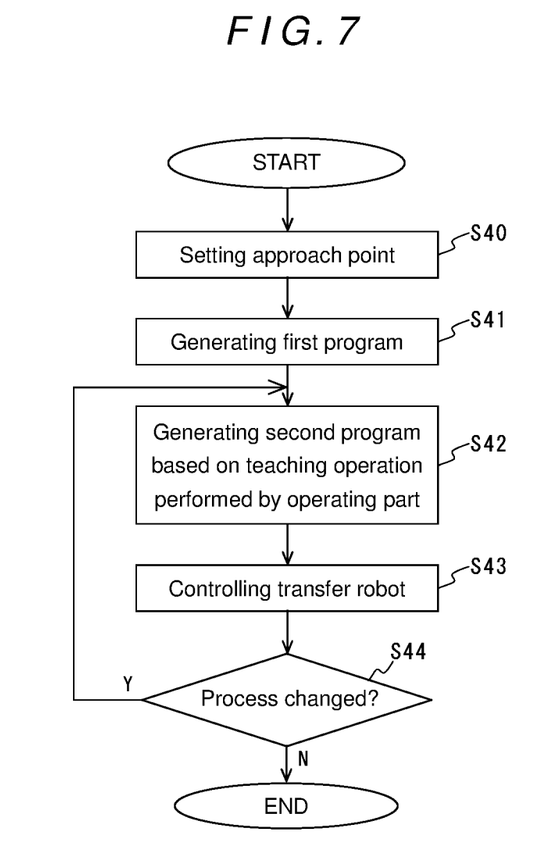
FIG. 7 is a flowchart showing operation of the transfer robot.

Next, an operation flow of the control device 4 shown in FIG. 2 is described. As shown in FIG. 7, first, the approach point setter 6 (see FIG. 2) sets an approach point AP (step S40). In this example, the approach point AP is set for each of the workpiece processing devices 2. After the setting of the approach point AP is finished, the first program generator 7 (see FIG. 2) generates a first program which defines the operation of the transfer robot 3 from the operational zero point for the transfer robot 3 to the approach point AP as described above (step S41).

Subsequently, the second program generator 8 generates a second program which defines the operation of the transfer robot 3 after the approach point AP as described above, based on the teaching operation performed by the operating part 5 (step S42). The robot controller 9 controls the operation of the transfer robot 3 in accordance with the first program generated by the first program generator 7 and the second program generated by the second program generator 8 (step S43).

At this point, if there is any change in the processing process between the workpiece processing devices 2 (Yes in the step S44), the operation flow returns to the step S42 and the second program is regenerated. That is to say, even when there is any change in the processing process, the approach points AP that are reference points for approaching the workpiece processing devices 2 are unchanged, and therefore the first program can be used without any change. Therefore, even when there is any change in the processing process, no teaching operation to the transfer robot 3 is needed for the operation from the operational zero point to the approach point AP, which greatly reduces the number of operator's operations. Note that, in the case where there is no change in the processing process (No in the step S44), the process is ended.

As described above, in the workpiece processing system 1 according to this embodiment, the approach point setter 6 sets an approach point AP which cannot cause interference by the transfer robot 3 in the workpiece-holding state, without performing a teaching. Further, the first program generator 7 generates a first program that defines the operation of the transfer robot 3 from the operational zero point for the transfer robot 3 to the approach point AP, and the second program generator 8 generates a second program that defines the operation of the transfer robot 3 after the approach point AP, based on the teaching operation. The robot controller 9 controls the operation of the transfer robot 3 in accordance with the first program and the second program. Thus, setting the approach point AP based on the non-interference region NR enables generation of an operation program (first program) which defines the operation of the transfer robot 3 from the operational zero point to the approach point AP and ensures that no interference by the transfer robot 3 occurs. Therefore, using this first program eliminates the need of performing a teaching for the operation of the transfer robot 3 from the operational zero point to a position equivalent to the approach point AP, which is needed in the conventional art. Thereby, the number of operator's operations can be greatly reduced.

Further, in this embodiment, the approach pointer setter 6 is configured to set the approach point AP at a point spaced by a predetermined distance from the loading and unloading aperture 2i that is a portion for approach point setting. Therefore, the approach point AP can be set easily on the basis of the portion for approach point setting and the predetermined distance.

Further, in this embodiment, each of the workpiece processing devices 2 has, as the portion for approach point setting, the loading and unloading aperture 2i provided therein, the loading and unloading apertures 2i having an identical shape; therefore, the approach point AP can be set easily on the basis of the loading and unloading aperture 2i.

Further, in this embodiment, the footprint of each workpiece processing device 2 is set on the basis of a square unit size. Therefore, the non-interference region NR can be recognized easily. Thereby, the setting of the approach point AP is facilitated.

Further, in this embodiment, the approach point setter 6 is configured to set the approach point AP at a position commonized for the workpiece processing devices 2 of each module size. Therefore, it is possible to reduce the number of steps for setting the approach point AP in the case where, as in this embodiment, two or more workpiece processing devices 2 have the same size.

Further, in this embodiment, the workpiece processing devices 2 are arranged to surround the transfer robot 3 in plan view and arranged such that their lines on the transfer robot 3 side in plan view together substantially form a U-shape. That is to say, arrangement of the workpiece processing devices 2 is regularized. Therefore, the non-interference region NR can be recognized easily. Thereby, the setting of the approach point AP is facilitated.

Hereinbefore, the workpiece processing system 1 according to one embodiment of the present invention has been described. However, the workpiece processing system 1 is not limited to the above-described configuration; the workpiece processing system 1 can be implemented in other manners and the following variations may be applied to the workpiece processing system 1.

Figure 8:
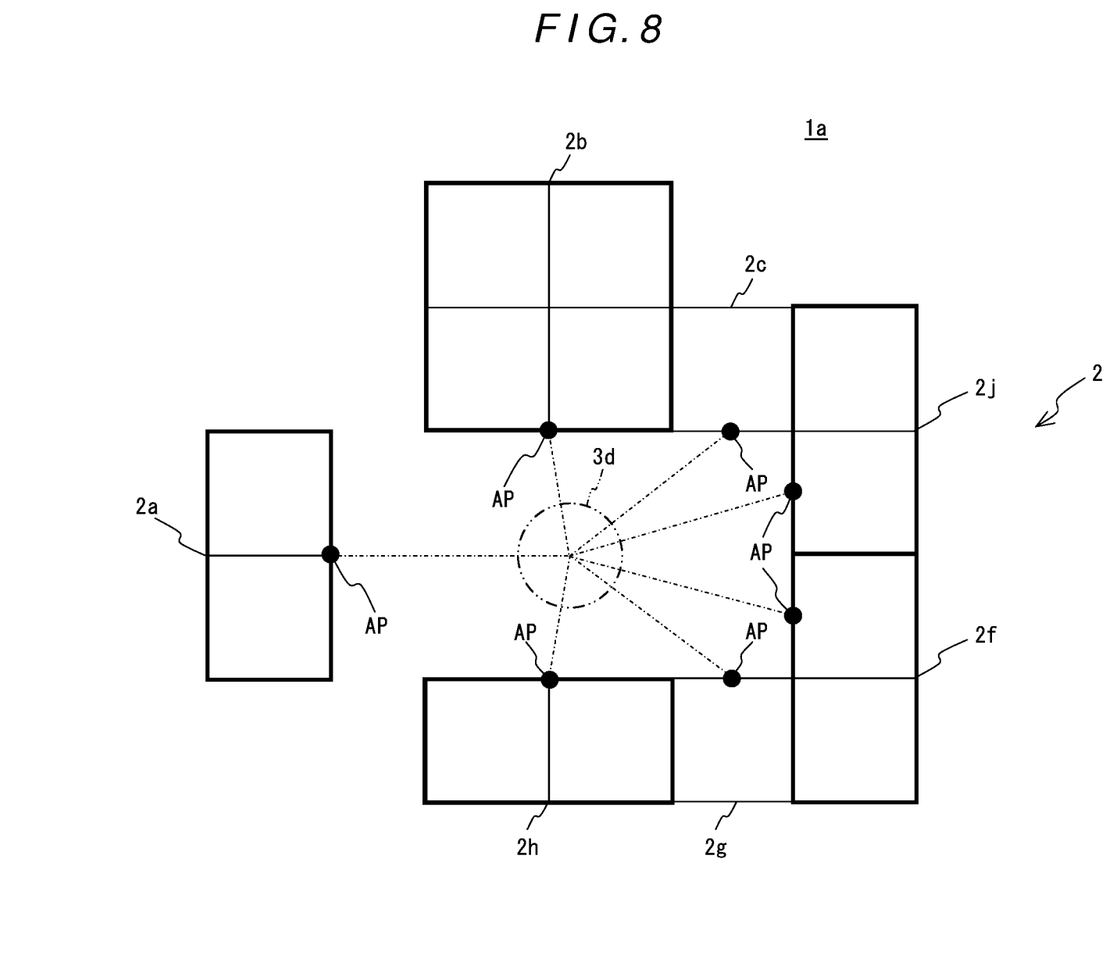
FIG. 8 is a schematic plan view showing another type of approach point setting position.

The above embodiment describes the configuration in which each of the workpiece processing devices 2 has the loading and unloading aperture 2i provided in the top surface portion thereof. However, the present invention is not limited thereto and a configuration may be employed in which each of the workpiece processing devices 2 has the loading and unloading aperture 2i provided in a front surface portion thereof. FIG. 8 is a schematic plan view showing another type of approach point setting position, which is viewed identically to FIG. 1. In FIG. 8, the transfer robot 3 is illustrated in a simplified manner. As shown in FIG. 8, the approach point AP can be set at a position above the loading and unloading aperture 2i (i.e., a position spaced by a predetermined distance from the loading and unloading aperture 2i that is the aforementioned portion for approach point setting). Note that the difference between the configuration of the workpiece processing system 1 of FIG. 1 and the configuration of the workpiece processing system 1a of FIG. 8 is that, in FIG. 8, instead of the workpiece processing devices 2d, 2e of FIG. 1, a workpiece processing device 2j of two-module size, which is identical to the size of the workpiece processing devices 2f etc., is disposed. This difference results from taking into account the fact that each of the workpiece processing devices 2 has the loading and unloading aperture 2i provided in the front surface portion thereof.

Further, in the above embodiment, the footprints of the workpiece processing devices 2 are standardized on the basis of a square unit size. However, the present invention is not limited thereto. The footprint of each workpiece processing device 2 may be set to be unique, as long as the workpiece processing devices 2 are arranged such that their lines on the transfer robot 3 side in plan view together form, for example, a U-shape.

Further, in the above embodiment, the footprints of the workpiece processing devices 2 are standardized. However, the present invention is not limited thereto. The sizes (length, width, and height) of the workpiece processing devices 2 may be standardized, i.e., modularized.

Further, in the above embodiment, the installation area for each workpiece processing device 2 is square. However, the present invention is not limited thereto. The installation area may be formed in, for example, a rectangular shape.

Further, in the above embodiment, the workpiece processing devices 2 are arranged such that their lines on the transfer robot 3 side in plan view together form a U-shape. However, the present invention is not limited thereto. The workpiece processing devices 2 may be arranged such that the lines form at least a part of a U-shape or such that the lines from at least a part of a circle.

Further, in the above embodiment, an articulated robot is given as an example of the transfer robot 3. However, the present invention is not limited thereto. Various types of robots can be employed which can load and unload a workpiece into and from the workpiece processing devices 2.

Further, in the above embodiment, an NC machine tool, and a measuring device, etc., are given as examples of the workpiece processing devices 2. However, the present invention is not limited thereto. Each workpiece processing device 2 may be another type of device which processes a workpiece.

REFERENCE SIGNS LIST

1 Workpiece processing system
1a Workpiece processing system
2 Workpiece processing device
2i Loading and unloading aperture (portion for approach point setting)
3 Transfer robot
4 Control device
5 Operating part
6 Approach point setter
7 First program generator
8 Second program generator
9 Robot controller (controller)
AP Approach point
NR Non-interference region
TP1 Teaching point
TP2 Teaching point

The invention claimed is:

1. A workpiece processing system, comprising:
a plurality of workpiece processing devices processing a workpiece;
a transfer robot loading and unloading the workpiece into and from each of the workpiece processing devices;
a control device controlling operation of the transfer robot; and
an operating part connected to the control device to perform a teaching operation to the transfer robot by manually operating the transfer robot,
the control device including:
an approach point setter setting in advance an approach point corresponding to each of the workpiece processing devices as a reference point for the transfer robot to start operation to the workpiece processing device;
a first program generator generating a first program defining the operation of the transfer robot from an operational zero point for the transfer robot to the approach point set by the approach point setter;
a second program generator generating a second program defining the operation of the transfer robot after the approach point based on the teaching operation performed by the operating part; and
a controller controlling the operation of the transfer robot in accordance with the first program generated by the first program generator and the second program generated by the second program generator, wherein:

each of the workpiece processing devices has a footprint set to an integral multiple of a unit size, with a smallest one of the footprints of the workpiece processing devices being designated as the unit size, and has a portion for approach point setting provided therein for setting the approach point;

the approach point setter is configured to, with a loading and unloading aperture of each of the workpiece processing devices through which the workpiece is loaded into and unloaded from the workpiece processing device by the transfer robot being designated as the portion for approach point setting of the workpiece processing device, set the approach point at a point spaced by a predetermined distance from the portion for approach point setting in a three-dimensional space; and each of the workpiece processing devices has the loading and unloading aperture at a position commonized for the workpiece processing devices of each size, and the approach point setter is configured to set the approach point at the position commonized for the workpiece processing devices of each size.

2. The workpiece processing system according to claim 1, wherein:

the loading and unloading apertures of the workpiece processing devices have an identical shape.

3. The workpiece processing system according to claim 1, wherein the workpiece processing devices are arranged to surround the transfer robot in plan view and arranged such that their lines on the transfer robot side in plan view form at least a part of a U-shape.

4. The workpiece processing system according to claim 1, wherein the approach point setter is configured to set the approach point at a position located above the workpiece processing device or at a position located higher than an upper end position of the workpiece processing device between the workpiece processing device and the transfer robot.

5. The workpiece processing system according to claim 2, wherein the approach point setter is configured to set the approach point at a position located above the workpiece processing device or at a position located higher than an upper end position of the workpiece processing device between the workpiece processing device and the transfer robot.

6. The workpiece processing system according to claim 5, wherein the approach point setter is configured to set the approach point at a position located above the workpiece processing device or at a position located higher than an upper end position of the workpiece processing device between the workpiece processing device and the transfer robot.

7. The workpiece processing system according to claim 2, wherein the workpiece processing devices are arranged to surround the transfer robot in plan view and arranged such that their lines on the transfer robot side in plan view form at least a part of a U-shape.

8. The workpiece processing system according to claim 7, wherein the approach point setter is configured to set the approach point at a position located above the workpiece processing device or at a position located higher than an upper end position of the workpiece processing device between the workpiece processing device and the transfer robot.

* * * * *